Sept. 3, 1957  K. ZIETZ  2,804,781
GEARING FOR MACHINE TOOLS AND THE LIKE
Filed Nov. 15, 1954

Inventor
K. Zietz

United States Patent Office 2,804,781
Patented Sept. 3, 1957

2,804,781
GEARING FOR MACHINE TOOLS AND THE LIKE

Kurt Zietz, Siegen, Westphalia, Germany

Application November 15, 1954, Serial No. 468,885

Claims priority, application Germany September 30, 1954

5 Claims. (Cl. 74—396)

The object of the invention is the provision of a gear unit made as a separate constructional element which can be separately produced ready for mounting and then be built into a machine tool.

Hitherto in large and small planing machines, milling machines and other machine tools having a table which has a reciprocating movement in the machine bed, the gearing for driving the table had its parts directly mounted in the machine bed. This arrangement involves very exact production of the bearing bores both as regards their dimensions and their position. The precision workmanship necessary for this purpose is especially expensive on large work pieces because it requires very accurate heavy machine tools. Especially difficult is the accuracy of location of the main driving pinion whether of the spur or worm type in relation to the toothed rack on the table because not only are the tolerances on the dimensions of the bearings for the pinion of decisive importance but also the tolerances on the mounting of the rack and on the table guides.

According to the invention these difficulties are reduced by mounting the whole of the gearing in a gear casing which is mounted rockably in the machine bed about the axis of the input shaft. It may be rockable on the shaft itself or on bearings concentric therewith.

The height of the gear casing at the region of the pinion which projects therefrom, to adjust the mesh of the rack and pinion, can be adjusted by the aid of packing pieces or the like but according to another feature of the invention it can be set by an adjusting device, which is located on the opposite end of the gear casing to that where the input shaft enters it and which enable the height of the pinion to be adjusted in relation to the rack so that the tooth clearances can easily be set with great precision.

The relatively small gear unit can be made by itself with great precision and then conveniently be built into the machine bed.

The bearing tolerances for the input shaft which projects laterally from the machine bed can be very coarse without the exact adjustment of the interengaging teeth of the pinion and rack being affected. The production of a planing, milling or like machine is thus simplified and cheapened by the invention.

An example of a planing machine embodying the invention is illustrated in the accompanying drawing.

Figure 1:
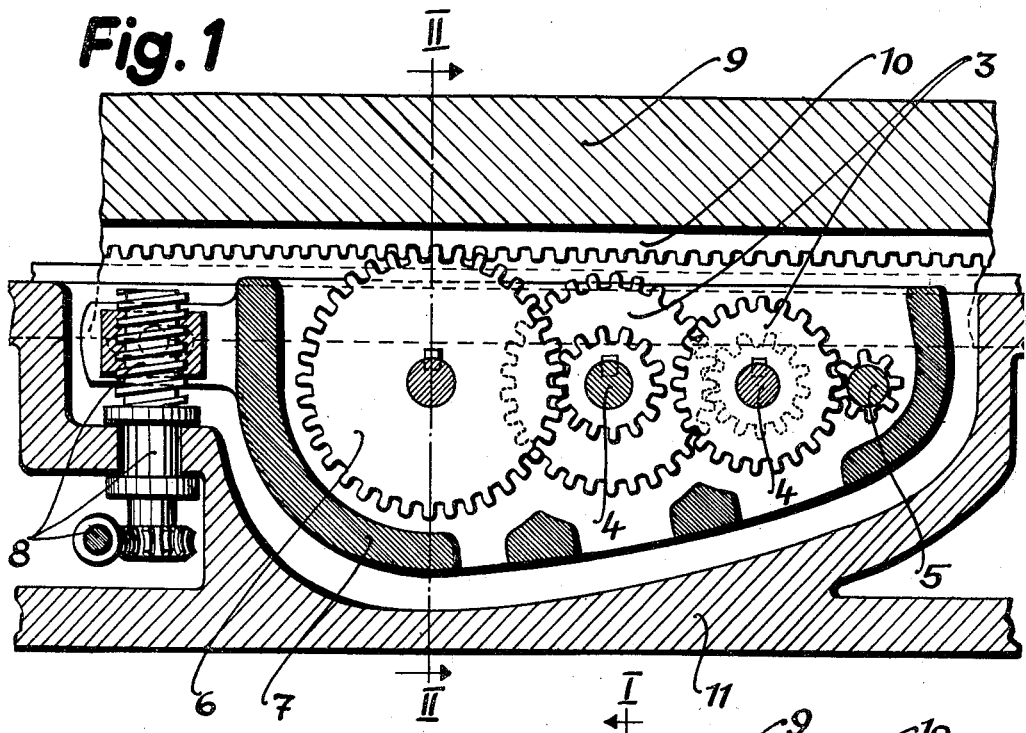
Figure 2:
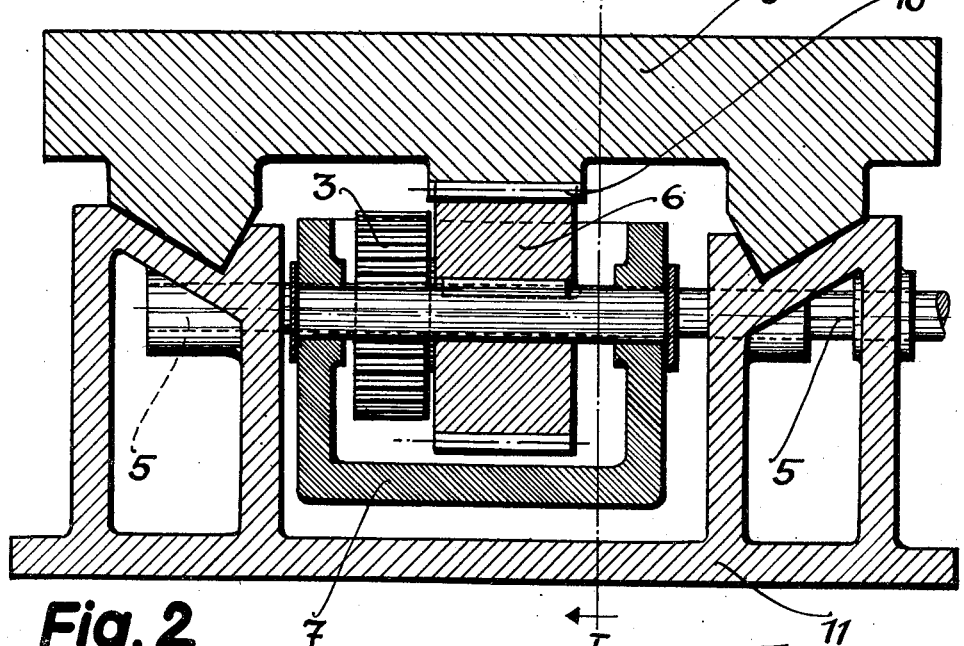

Fig. 1 is a longitudinal section and
Fig. 2 is a cross section in the line II—II of Fig. 1.

Gear wheels 3 with their shafts 4, an input shaft 5 and a table driving pinion 6 constitute a gear unit mounted in a gear casing 7. The casing 7 is rockable about the axis of the input shaft 5, in this instance rockable on the shaft itself but it might be rockable on bearings concentric with the shaft 5, and is provided at the other end with an adjusting and fixing device 8 for adjusting its height so that the meshing of the pinion 6 in a rack 10 secured to the table 9 can be exactly adjusted and there held. The machine bed 11 is recessed to receive the gear casing 7. It will be seen that in this example the adjusting device 8 comprises a threaded spindle prevented from axial movement and rotatable through worm gearing. Such a device is self-locking when adjusted.

Although the invention is particularly adapted to machine tools having a reciprocating table it is not limited to machines of this character but can be used wherever it is possible to build the driving gear as a unit or in a casing and to bring only the input and output parts into engagement with the driving or driven parts.

I claim:

1. In a machine tool, a bed, a table guided for reciprocating motion in relation to said bed, a rack on the underside of said table, an input shaft journalled in said bed, a separate casing housed in a recess in said bed beneath said rack and having one end rockably mounted on said input shaft, a pinion journalled in said casing near the end remote from the input shaft and projecting in line with said rack, a train of gearing in said casing coupling said input shaft to said pinion, and a screw adjustment between said bed and the end of said casing remote from said input shaft whereby the meshing of said pinion with said rack may be precisely adjusted.

2. In a machine tool, a bed, a table guided for reciprocating motion in relation to said bed, a rack on the underside of said table, an input shaft journaled in said bed, a separate casing rockably mounted on said input shaft beneath said rack about the axis of the input shaft, a driving pinion in said casing remote from said input shaft, means in said casing driving said driving pinion from said input shaft, said input shaft being so located with respect to said rack that rocking of said casing thereabout moves said driving pinion toward or away from said rack.

3. In a device of the character described, a bed, a table guided for reciprocating motion on said bed, a rack on said table, a gear casing, a train of gearing in said casing comprising a drive pinion having a segment extending beyond said casing to mesh with said rack, an input pinion and an input shaft keyed to said input pinion and extending laterally beyond said gear casing, bearings in said casing and in said bed to support said input shaft, said bearing in said bed being spaced from said rack a distance approximating the radius of said drive pinion, and an adjustable support for said casing adjacent said drive pinion whereby the end of said casing adjacent said drive pinion may be moved toward or away from said rack to adjust the depth of meshing of said drive pinion and rack.

4. The device of claim 2, in which the adjusting means comprises a screw means mounted against axial movement in said bed operating in a nut mounted on said casing.

5. In a machine of the type described, a machine bed, a table movable in relation to said bed, a rack mounted on said table, a gear casing separate from said bed, a gear train including an input shaft and a driving pinion for driving engagement with said rack mounted in said casing, a common supporting bearing for said casing and said input shaft at one end of said casing, and an adjustable support on said casing adjacent said driving pinion at the other end of said casing, said casing being mounted in said bed to pivot about said common bearing under the influence of said adjustable support whereby the meshing of said driving pinion and rack may be adjusted toward and away from said rack.

References Cited in the file of this patent

UNITED STATES PATENTS 1,884,196    Peterson _____ Oct. 25, 1932

FOREIGN PATENTS 556,314    Great Britain _____ Sept. 29, 1943